(12) United States Patent
Podyma et al.

(10) Patent No.: US 9,169,686 B1
(45) Date of Patent: Oct. 27, 2015

(54) WINDOW ASSEMBLIES

(71) Applicant: Goodrich Corporation, Charlotte, NC (US)

(72) Inventors: Steven Podyma, New Milford, CT (US); William Zmek, Bethlehem, CT (US)

(73) Assignee: Goodrich Corporation, Charlotte, NC (US)

( * ) Notice: Subject to any disclaimer, the term of this patent is extended or adjusted under 35 U.S.C. 154(b) by 0 days.

(21) Appl. No.: 14/276,549

(22) Filed: May 13, 2014

(51) Int. Cl.
*E06B 1/36* (2006.01)
*E06B 1/26* (2006.01)
*B64C 1/14* (2006.01)

(52) U.S. Cl.
CPC ............... *E06B 1/26* (2013.01); *B64C 1/1492* (2013.01); *E06B 1/36* (2013.01)

(58) Field of Classification Search
CPC .......... B64C 1/1492; B64C 1/14; E06B 1/36; B60J 10/02; B60J 10/0068; B60J 10/0071; B60J 10/006; B60J 10/0054
USPC .................. 52/204.5, 208, 204.599, 204.591
See application file for complete search history.

(56) References Cited

U.S. PATENT DOCUMENTS

| | | | | | |
|---|---|---|---|---|---|
| 2,608,279 | A | * | 8/1952 | Pearse | 52/208 |
| 4,833,847 | A | * | 5/1989 | Inayama et al. | 52/208 |
| 4,916,873 | A | * | 4/1990 | Keys | 52/208 |
| 5,144,777 | A | * | 9/1992 | Fishel et al. | 52/144 |
| 5,150,943 | A | * | 9/1992 | Gold | 296/201 |
| 6,206,453 | B1 | * | 3/2001 | Farrar et al. | 296/146.15 |
| 6,487,823 | B2 | * | 12/2002 | Lagrue | 52/208 |
| 6,851,379 | B2 | * | 2/2005 | Black | 114/177 |
| 7,661,626 | B2 | * | 2/2010 | Wood | 244/129.3 |
| 8,353,137 | B2 | * | 1/2013 | Boer et al. | 52/204.5 |
| 2002/0121054 | A1 | * | 9/2002 | Lagrue | 52/208 |

OTHER PUBLICATIONS

Mirror Mounts & Bonds Part 9—Kinematic Mounts, Flexures, Bonds, High Poisson Materials—by Sigmadyne Inc. dated Jun. 2011.

* cited by examiner

*Primary Examiner* — Brent W Herring
(74) *Attorney, Agent, or Firm* — Locke Lord LLP; Scott D. Wofsy; Alicia J. Carroll

(57) ABSTRACT

A flexure ring for a window assembly includes a continuous annular portion and a segmented portion. The continuous annular portion defines a ring axis. The segmented portion defines a plurality of circumferential segments. The continuous annular portion is connected to each circumferential segment by a respective neck. Each neck extends from the continuous annular portion to a respective one of the circumferential segments. The continuous annular portion, the segmented portion and the necks are configured to circumscribe a window pane.

8 Claims, 3 Drawing Sheets

WINDOW ASSEMBLIES

STATEMENT REGARDING FEDERALLY SPONSORED RESEARCH OR DEVELOPMENT

This invention was made with government support under contract number W9089-34082 awarded by the U.S. Department of Defense. The government has certain rights in the invention.

BACKGROUND OF THE INVENTION

1. Field of the Invention

The present disclosure relates to window assemblies, and more particularly to window assemblies such as those that require specific optical performance for use in applications that can impose stress, such as in the exterior of aircraft, other vehicles, and environmental test chambers.

2. Background of the Related Art

Windows installed on vehicles need to be durable but also meet stringent optical and mechanical requirements depending on the intended application. A traditional window assembly includes a window substrate cemented into a frame using a compliant adhesive, such as a room temperature vulcanizing (RTV) material. The RTV bond provides isolation of the window from environmental loads. The portions of loads that are not absorbed by the RTV bond layer can be transmitted to the window and can cause stress and strain in the window substrate. Stress and strain can alter a window's optical properties. As a result, traditional window assemblies can have variable optical and mechanical performance depending on forces acting on the vehicle housing them.

Such conventional methods and systems have generally been considered satisfactory for their intended purposes. However, there is still a need in the art for improved window assemblies. The present disclosure provides a solution for this need.

SUMMARY OF THE INVENTION

A flexure ring for a window assembly includes a continuous annular portion and a segmented portion. The continuous annular portion defines a ring axis. The segmented portion defines a plurality of circumferential segments. The continuous annular portion is connected to each circumferential segment by a respective neck. Each neck extends from the continuous annular portion to a respective one of the circumferential segments. The continuous annular portion, the segmented portion and the necks are configured to circumscribe a window pane.

Each neck can extend from the continuous annular portion in a substantially axial direction with respect to the ring axis, and/or at an angle with respect to the ring axis, e.g. in a cantilevered fashion. The circumferential dimension of each neck can be less than the circumferential dimension of its respective circumferential segment. Each circumferential segment, respective necks and continuous annular portion can have substantially similar inner diameters when in a relaxed state. The radially outer extent of the continuous annular portion can be greater than the radially outer extent of the segmented portion and the necks when in a relaxed state.

A window assembly includes a window pane and a flexure ring. The window pane has opposed top and bottom surfaces and an outer periphery. The flexure ring defines a ring axis and is mounted to the outer periphery of the window pane for providing the window pane with substantial isolation from vehicle induced loads.

The window assembly can include an elastomeric material between the outer periphery of the window pane and the flexure ring. Each circumferential segment can have an inner diameter surface and an outer diameter surface. The inner diameter surface can be secured to the window pane. The continuous portion of the flexure ring has an inner diameter surface and an outer diameter surface, wherein the outer diameter surface is secured to a frame. An adhesive layer can be disposed on an inner diameter surface of each circumferential segment. The adhesive layer can be segmented to correspond to each circumferential segment.

The window assembly can also include an intermediary ring mounted radially between the outer periphery of the window pane and the flexure ring. Each circumferential segment can have an inner diameter surface and an outer diameter surface. The inner diameter surface can be secured to an outer diameter surface of the intermediary ring.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
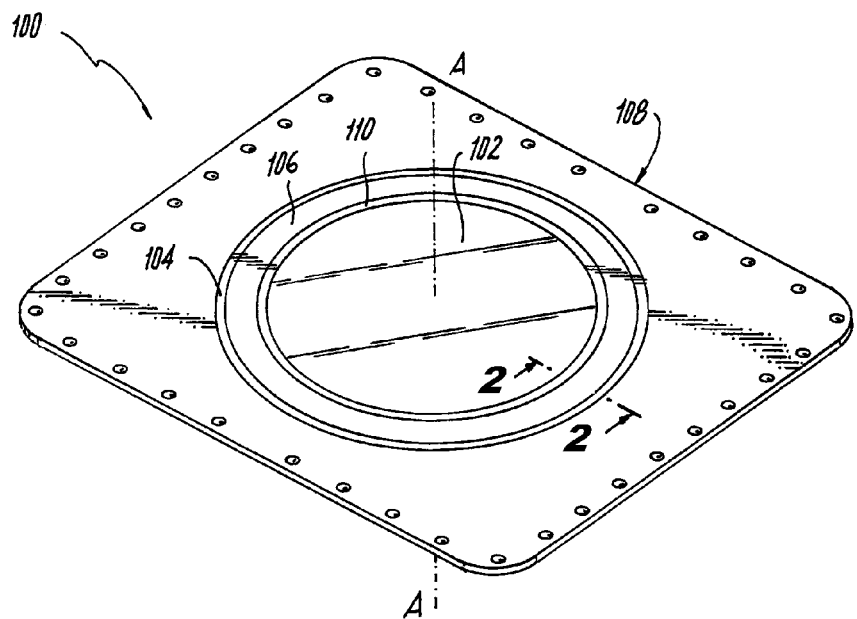
FIG. 1 is a perspective view of an exemplary embodiment of a window assembly constructed in accordance with the present disclosure showing the window pane, the flexure ring, the intermediary ring and the frame.

Reference will now be made to the drawings wherein like reference numerals identify similar structural features or aspects of the subject disclosure. For purposes of explanation and illustration, and not limitation, a perspective view of an exemplary embodiment of a window assembly accordance with the disclosure is shown in FIG. 1 and is designated generally by reference character 100. The systems and methods described herein can be used in windows for vehicles, or for mirrors, lenses or windows in any other suitable optical instrument, for example, to provide isolation from loads transmitted through the frame while maintaining out-of-plane stiffness.

As shown in FIG. 1 window assembly 100 includes a window pane 102, a flexure ring 104, an intermediary ring 106 and a frame 108. Intermediary ring 106 is mounted between the outer periphery of window pane 102 and an inner periphery of flexure ring 104. Flexure ring 104 defines a ring axis A. Window pane 102, flexure ring 104, and intermediary ring 106 are all mounted within frame 108. Those skilled in the art will readily appreciate that flexure ring 104 can provide window pane 102 with substantial isolation from loads transmitted through the frame. It is also contemplated that the flexure ring 104 tends to allow for greater isolation from environmental loads as compared with traditional window assemblies while allowing the continued use of traditional thin RTV bonds or even eliminating the traditional RTV bond entirely. Those skilled in the art will readily appreciate that there can be a trade-off between RTV bonds and out-of-plane stiffness, e.g. a thicker RTV bond tends to provide greater isolation from in-plane loads, but reduced out-of-plane stiffness.

Figure 2:
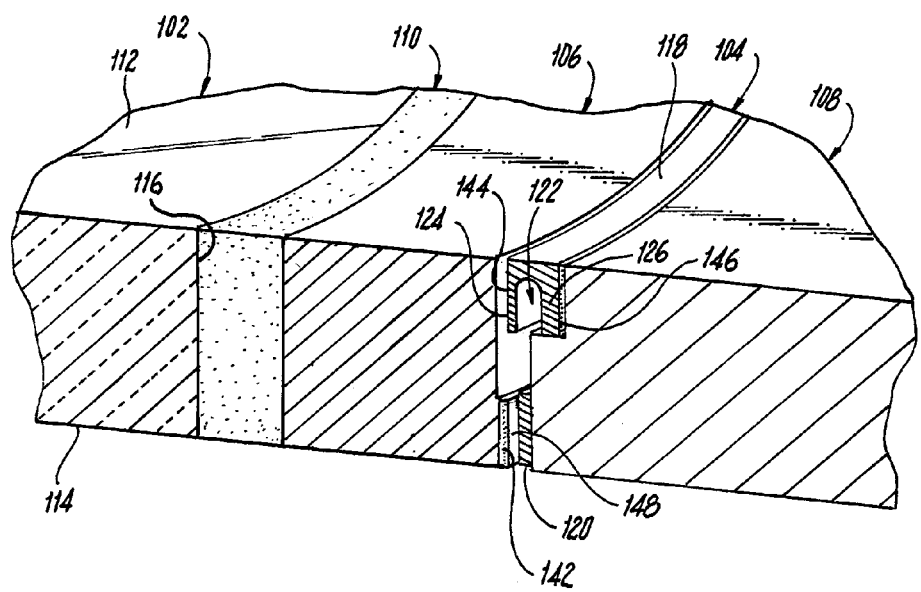
FIG. 2 is a cross-sectional perspective view of a portion of the window assembly of FIG. 1, showing the continuous annular portion and the segmented portion of the flexure ring.

Now with reference to FIG. 2, window pane 102 has opposed top and bottom surfaces, 112 and 114, respectively, and an outer periphery 116. Flexure ring 104 includes a continuous annular portion 118 and a segmented portion 120. Continuous annular portion 118 defines a circumferential channel 122 separating an inner diameter flange 124 and an outer diameter flange 126. Continuous portion 118 of flexure ring 104 has an inner diameter surface 144 and an outer diameter surface 146. Inner diameter surface 144 is proximate to intermediary ring 106. Outer diameter surface 146 is secured to frame 108 with an adhesive, e.g. an elastomeric material, such as a RTV material. Those skilled in the art will readily appreciate that while flexure ring 104 is described herein as being affixed to frame 108 using an adhesive, a mechanical fastening method, or any other suitable fastening method can be used.

Figure 3:
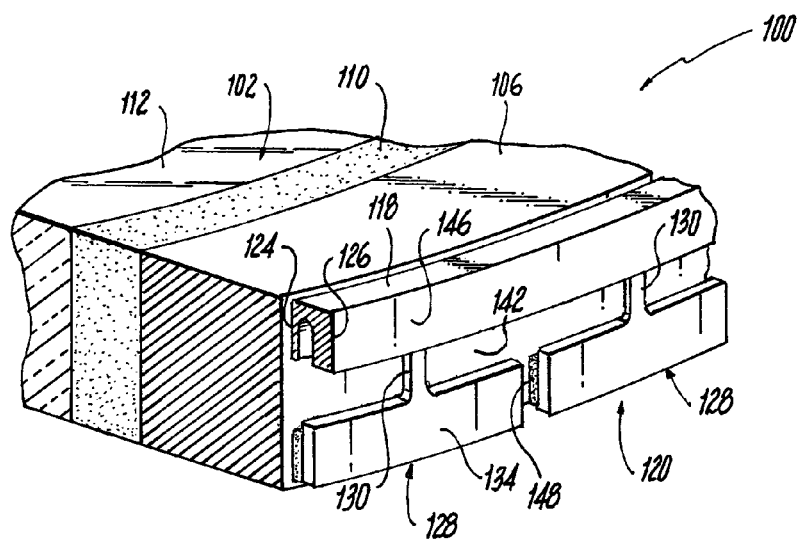
FIG. 3 is a cross-sectional perspective view of a portion of the window assembly of FIG. 1, showing the circumferential segments of the flexure ring with the frame removed.

As shown in FIG. 3, an elastomeric material 110, such as a RTV material, is disposed between the outer periphery of window pane 102 and intermediary ring 106. Segmented portion 120 defines circumferential segments 128. Continuous annular portion 118 is connected to each circumferential segment 128 by a respective neck 130. Necks 130 extend from the inner diameter flange 124 in a substantially axial direction with respect to ring axis A. It is also contemplated that necks 130 can extend from inner diameter flange 124 at an angle with respect to ring axis A, e.g. in a cantilevered fashion in a radially inward and/or outward direction.

With continued reference to FIG. 3, continuous annular portion 118, segmented portion 120, and necks 130 all circumscribe intermediary ring 106, and in turn, window pane 102. Continuous annular portion 118, segmented portion 120, and necks 130 can be tuned to achieve a desired stiffness in the radial, tangential and hoop directions, e.g. necks 130 and circumferential segments 128 can be thicker or thinner, longer or shorter, narrower or wider, and/or any other suitable shape depending on what is suitable for a given application and the expected operating conditions of window 102. For example, necks 130, continuous annular portion 118, and/or circumferential segments 128 can be thicker at the ends and thinner in the middle, and/or thinner on the ends and thicker in the middle. In other words, necks 130, continuous annular portion 118, and/or circumferential segments 128 can be shaped depending on the desired stiffness/compliance, natural frequency, peak stress, optical distortion of window pane 102, and the like. The individual circumferential segments 128 and their respective necks 130 tend to provide more isolation from in-plane environmental loads without detrimentally increasing out-of-plane compliance (motion). Further, those skilled in the art will readily appreciate that the number of circumferential segments 128 making up the segmented portion 120 can vary depending on the number required for a given application.

Figure 4:
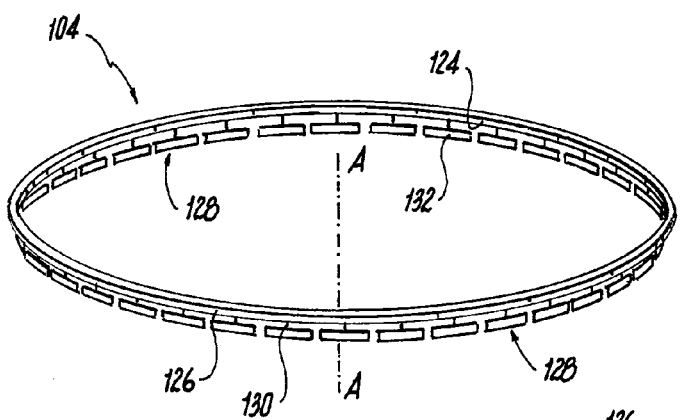
FIG. 4 is a perspective view of an exemplary embodiment of a flexure ring constructed in accordance with the present disclosure showing the continuous annular portion and the segmented portion.
Figure 5:
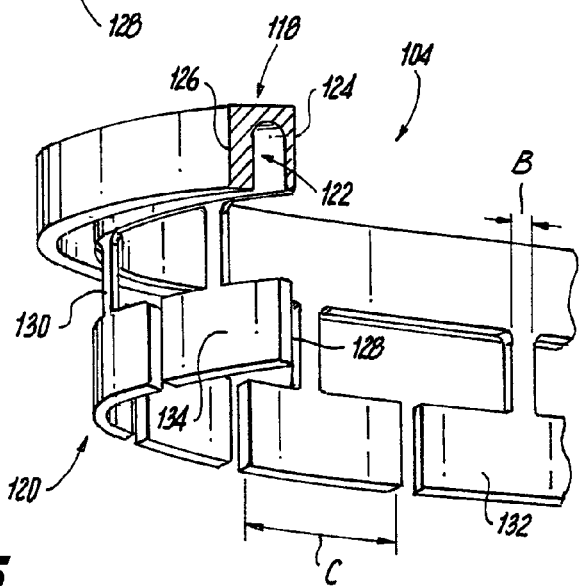
FIG. 5 is a cross-sectional perspective view of a portion of the flexure ring of FIG. 4, showing the continuous annular portion, the segmented portion, and the necks.

As shown in FIGS. 3, 4 and 5, circumferential segments 128 have an inner diameter surface 132 and an outer diameter surface 134. Inner diameter surfaces 132 of circumferential segments 128 are secured to an outer diameter surface 142 of intermediary ring 106 with an adhesive 148, such as a RTV material, other fastening means, or the like. Intermediary ring 106 can tend to provide additional attenuation of loads transmitted from the external environment to window pane 102. In an alternate embodiment, intermediary ring 106 is omitted and inner diameter surface 132 is secured to window pane 102 with an elastomeric material 110, e.g. a RTV material, or other adhesive or fastening means. Those skilled in the art will also appreciate that while inner diameter surfaces 132 of circumferential segments 128 are shown and described herein as being secured to either outer diameter surface 142 of intermediary ring 106 or window pane 102 with an adhesive, inner diameter surfaces 132 can be secured with a mechanical fastening method, or any other suitable fastening method.

Circumferential segments 128 can be sized for optimal stress distribution in the adhesive regions, e.g. between inner diameter surface 132 of circumferential segments 128 and outer diameter surface 142 of intermediary ring 106, for example. In other words, the shape and size of each circumferential segment 128 dictates the stress distribution in the adhesive layer, e.g. adhesive 148, and also its stiffness. The shape and size of circumferential segments 128 can also effect the performance of window assembly 100, as a whole, for example, it can vary the natural frequency, bond strength, and ultimately the optical performance. It is contemplated that flexure ring 104 can be mounted to frame 108, intermediary ring 106, and/or window pane 102 in a strain-free state. Those skilled in the art will readily appreciate that mounting in a strain-free state means, for example, assembling an opto-mechanical assembly where the critical optical and mechanical reference surfaces are aligned by use fixtures, then a suitable adhesive material, such as RTV or epoxy, is injected between desired mating surfaces while the parts are in a non-strained, or at-rest, condition.

With continued reference to FIGS. 3 and 4, an adhesive layer 148, e.g. a RTV material, is disposed on inner diameter surfaces 132 of each circumferential segment 128. Adhesive layer 148 can be continuous or segmented as shown, either partially or entirely, to correspond to each circumferential segment 128. For example, it is contemplated that adhesive layer 148 can be continuous along outer diameter surface 142 of intermediary ring 106, and/or can be continuous along outer diameter surface 142 of intermediary ring 106 but include scores in adhesive layer 148 between each respective circumferential segment to partially segment adhesive layer 148. Segmentation of adhesive layer 148, partially or entirely, tends to provide additional isolation between each circumferential segment 128 and provides for an expansion area for a substantially incompressible adhesive layer 148, e.g. a RTV material, under load conditions.

As shown in FIG. 5, a circumferential dimension B of each neck 130 is smaller than a circumferential dimension C of respective circumferential segments 128. Circumferential segments 128, necks 130, and continuous annular portion 118 have substantially similar inner diameters when in a relaxed state. A radially outer extent of continuous annular portion 118 is greater than a radially outer extent of segmented portion 120 and necks 130 when in a relaxed state. Variance between circumferential dimension B and circumferential dimension C can operate to produce compliance in the lateral direction, e.g. in a plane parallel to top and bottom surfaces, 112 and 114, respectively, and in the hoop direction. The thickness of flexure ring 104 and window pane 102, in the axial direction with respect to ring axis A, can be substantially the same, tending to provide a compact window assembly design.

Figure 6:
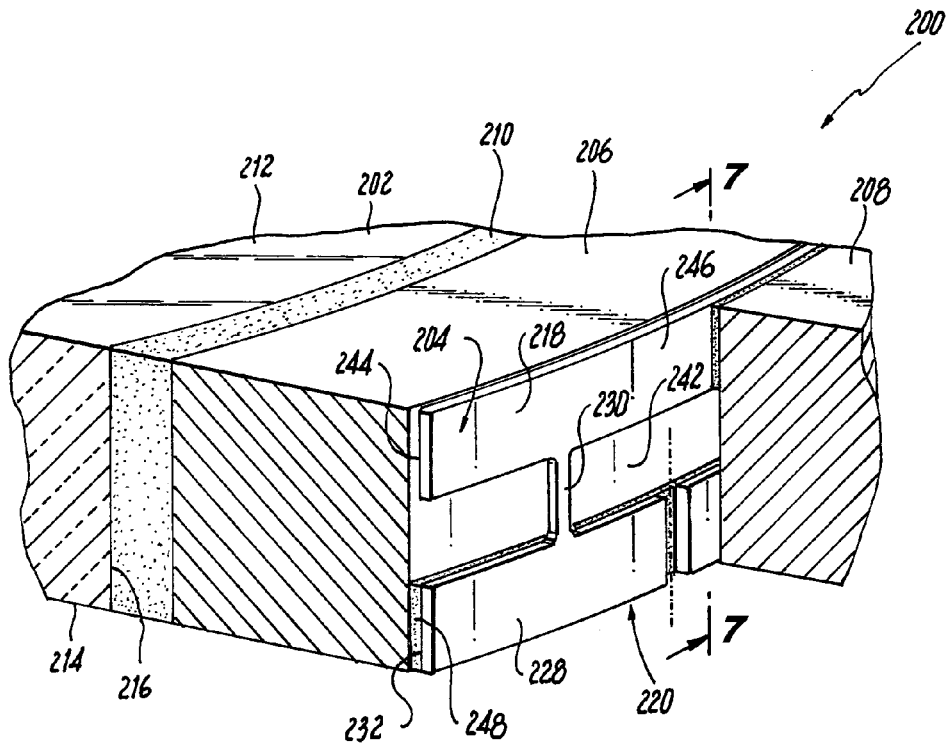
FIG. 6 is a cross-sectional perspective view of a portion of another exemplary embodiment of a window assembly constructed in accordance with the present disclosure, showing the continuous annular portion and the segmented portion of the flexure ring.

With reference now to FIG. 6, another embodiment of a window assembly 200 is shown. Window assembly 200 includes a window pane 202, an elastomeric material 210, an intermediary ring 206, and a frame 208, similar to window pane 102, elastomeric material 110, intermediary ring 106 and frame 108, described above. Window assembly 200 includes a flexure ring 204 that includes circumferential segments 228, similar to circumferential segments 128, described above. Inner diameter surfaces 232 of circumferential segments 228 are secured to an outer diameter surface 242 of intermediary ring 206 with an adhesive layer 248, such as a RTV material, other fastening means, as described above, except that adhesive layer 248 is in a continuous ring around outer diameter surface 242. Although continuous, it is contemplated that adhesive layer 248 can include scores, indicated schematically by the dashed line, between each respective circumferential segment 228 to partially or entirely segment adhesive layer 248.

Figure 7:
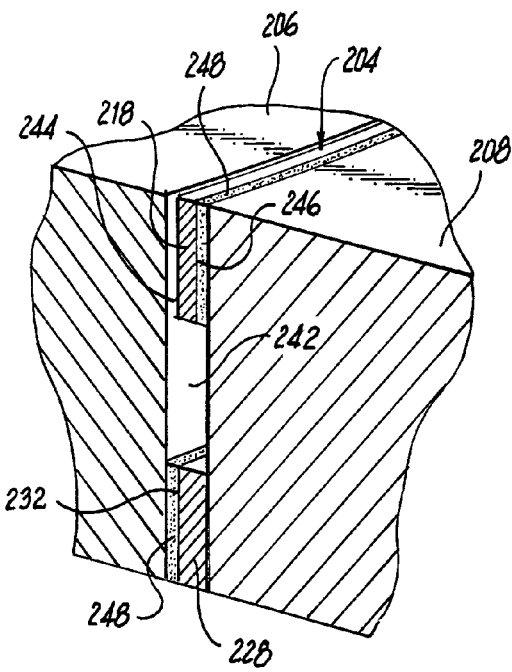
FIG. 7 is a cross-sectional perspective view of a portion of the window assembly of FIG. 6, showing the flexure ring secured to the frame.

As shown in FIG. 7, window assembly 200 includes a flexure ring 204, similar to flexure ring 204 described above, except that a continuous annular portion 218 of flexure ring 204 does not include opposing flanges. Instead, continuous annular portion 218 of flexure ring includes an inner diameter surface 244 and an outer diameter surface 246. Inner diameter surface 244 is proximate to an outer diameter surface 242 of intermediary ring 206. Outer diameter surface 246 is secured to frame 208 with an adhesive 248, e.g. an elastomeric material, such as a RTV material, described above.

With reference now to FIGS. 1-7, loads from frames 108 and 208 are distributed to their respective flexure rings 104 and 204 and then to their respective window panes 102 and 202 via respective necks 130 and 230 and circumferential segments 128 and 228 of the flexure rings 104 and 204. The in-plane compliance of necks 130 and 230 and circumferential segments 128 and 228 in the radial, tangential and hoop directions allows for loads imposed on a given point on their respective window panes 102 and 202 to be at least partially absorbed through respective necks 130 and 230 and circumferential segments 128 and 228, e.g. necks 130 and 230 and circumferential segments 128 and 228 on a side of respective window panes 102 and 202 opposite that of the applied loads. It is contemplated this absorption reduces the in-plane stress and strain experienced by window pane 102. In addition, as described above, use of intermediary rings 106 and 206 can provide additional absorption of in-plane, as well as, out-of-plane environmental loads. In traditional window assemblies, the bond layer, e.g. elastomeric material 110, can be sized to provide both athermalization and mechanical isolation. In some cases, this can tend to lead to very thick bond layers, e.g. elastomeric material 110 and 210, which can tend to increase out-of plane compliance. The use of intermediary rings 106 and 206 can allow elastomeric material 110 and 210 to be sized primarily for athermalization, allowing a thinner bond layer while flexure rings 104 and 204 can be designed for other isolating other loads.

The methods and systems of the present disclosure, as described above and shown in the drawings, provide for window assemblies with superior properties including improved isolation from vehicle induced loads while maintaining out-of-plane stiffness. While the apparatus and methods of the subject disclosure have been shown and described with reference to preferred embodiments, those skilled in the art will readily appreciate that changes and/or modifications may be made thereto without departing from the spirit and scope of the subject disclosure.

What is claimed is:

1. A window assembly comprising:
   a window pane having opposed top and bottom surfaces and an outer periphery; and
   a flexure ring defining a ring axis and mounted to the outer periphery of the window pane for providing the window pane with substantial isolation from vehicle induced loads, wherein the flexure ring includes a continuous portion and a segmented portion defining a plurality of circumferential segments, wherein the continuous portion is connected to each circumferential segment by a respective a neck, wherein each neck extends from the continuous portion in a substantially axial direction with respect to the ring axis to a respective one of the circumferential segments, wherein a circumferential dimension of each neck is less than a circumferential dimension of its respective circumferential segment, and wherein each circumferential segment extends away from and is aligned with the continuous portion in an axial direction parallel to the ring axis.

2. A window assembly as recited in claim 1, further comprising an elastomeric material between the outer periphery of the window pane and the flexure ring.

3. A window assembly as recited in claim 1, wherein each circumferential segment has an inner diameter surface and an outer diameter surface, wherein the inner diameter surface is secured to the window pane.

4. A window assembly as recited in claim 1, wherein the continuous portion of the flexure ring has an inner diameter surface and an outer diameter surface, wherein the outer diameter surface is secured to a frame.

5. A window assembly as recited in claim 1, wherein an adhesive layer is disposed on an inner diameter surface of each circumferential segment.

6. A window assembly as recited in claim 5, wherein the adhesive layer is segmented to correspond to each circumferential segment.

7. A window assembly as recited in claim 1, further comprising an intermediary ring mounted radially between the outer periphery of the window pane and the flexure ring.

8. A window assembly as recited in claim 7, wherein each circumferential segment has an inner diameter surface and an outer diameter surface, wherein the inner diameter surface is secured to an outer diameter surface of the intermediary ring.

* * * * *